United States Patent
Teshima et al.

(10) Patent No.: US 7,592,896 B2
(45) Date of Patent: Sep. 22, 2009

(54) VEHICLE DOOR CONTROL APPARATUS

(75) Inventors: Kentarou Teshima, Kariya (JP);
Kazuhiro Nakashima, Kariya (JP);
Kenichi Ogino, Toyota (JP)

(73) Assignee: DENSO Corporation, Kariya (JP)

( * ) Notice: Subject to any disclaimer, the term of this patent is extended or adjusted under 35 U.S.C. 154(b) by 137 days.

(21) Appl. No.: 11/790,966

(22) Filed: Apr. 30, 2007

(65) Prior Publication Data

US 2007/0290796 A1 Dec. 20, 2007

(30) Foreign Application Priority Data

Jun. 20, 2006 (JP) ............................. 2006-170351

(51) Int. Cl.
*B60R 25/00* (2006.01)
(52) U.S. Cl. ...................... 340/5.72; 340/505; 340/506;
340/539.1; 340/539.11; 340/539.13; 340/539.32;
340/572.1; 340/10.1; 340/825.36; 340/825.49;
340/5.2; 340/687; 340/691.1
(58) Field of Classification Search ................. 340/505,
340/506, 539.1, 539.11, 539.13, 539.32,
340/572.1, 10.1, 825.36, 825.49, 5.2, 687,
340/691.1
See application file for complete search history.

(56) References Cited

U.S. PATENT DOCUMENTS 7,305,284 B2 * 12/2007 Teshima et al. ................ 701/2

2004/0068935 A1  4/2004 Ichikawa et al.

FOREIGN PATENT DOCUMENTS

| DE | 10 2005 017 250 A1 | 6/2006 |
| DE | 10 2005 023 002 A1 | 6/2006 |
| JP | 05-106376 | 4/1993 |

OTHER PUBLICATIONS

Office Action dated Dec. 4, 2007 in DE Application No. 10 2007 021 943.3 with English translation.
Korean Notice of Invitation to Submit Opinion dated Feb. 28, 2008 issued in counterpart Korean Application 10-2007-0059943 with English translation.
Korean Office Action dated Aug. 26, 2008 issued in counterpart Korean Application 10-2007-0059943 with English translation.
Office Action issued Oct. 8, 2008 in U.S. Appl. No. 11/797,422.

* cited by examiner

*Primary Examiner*—Daryl C Pope
(74) *Attorney, Agent, or Firm*—Nixon & Vanderhye P.C.

(57) ABSTRACT

Based on a user's instruction, a door control unit drives a door opening/closing motor for a pop-up operation. A door is thereby rotated to a predetermined angle, which is smaller than a fully opened angle. Therefore, even when a user holds stuff in his/her hands, the door can be easily opened up to the predetermined angle. When the door is opened at the predetermined angle, the user can insert a part of his/her body into a gap corresponding to the predetermined angle and then further open the door by pushing the door from the door inside surface.

13 Claims, 4 Drawing Sheets

VEHICLE DOOR CONTROL APPARATUS

CROSS REFERENCE TO RELATED APPLICATION

This application is based on and incorporates herein by reference Japanese Patent Application No. 2006-170351 filed on Jun. 20, 2006.

FIELD OF THE INVENTION

The present invention relates to a vehicle door control apparatus.

BACKGROUND OF THE INVENTION

Patent document 1 describes a system including a vehicle door control apparatus, in which a door is unlocked based on verification of an ID code via a wireless communication between an in-vehicle wireless unit and a handheld wireless unit. The in-vehicle wireless unit transmits request signals within a communication area in proximity of the vehicle with given time intervals. When a response signal to the request signal is received and the response signal includes an ID code, the ID code is collated with a registered ID code. When the accordance between the ID codes is verified, all the doors of the vehicle are unlocked.

The system allows a holder of the wireless handheld unit to unlock the doors of the vehicle without holding a vehicle key at hand, which enhances a convenience in riding in the vehicle.

Patent document 1: JP-H05-106376 A

In other words, when accordance of the ID codes is verified, this system only unlocks the doors. To ride in the vehicle, the user needs to release a door latch by pulling a door handle and then further pulls the door handle open. The door can be thus opened for the user to ride in the vehicle.

When the user holds stuff in both the hands or arms, the door may not be easily opened.

SUMMARY OF THE INVENTION

It is an object of the present invention to provide a vehicle door control apparatus, which allows a vehicle door to smoothly open even when it is difficult for a user to operate a door handle by hand.

To achieve the above object, as a first aspect of the present invention, a door control apparatus for a vehicle is provided as follows. The apparatus can communicate with a handheld unit held by a user. An actuator is configured to change a rotation angle of a door of the vehicle to thereby rotate the door to be opened or closed in a use for the user to ride in or get out the vehicle. A verification unit is configured to obtain an ID code of the handheld unit to verify an accordance between the obtained ID code and a registered ID code. A manipulation detection unit is configured to detect a manipulation by the user to an unlock switch in a door handle of the door. An unlock unit is configured to unlock the door when the accordance is verified and the manipulation to the unlock switch is detected. An instruction detection unit is configured to detect a pop-up instruction, which is issued by the user approaching the door for activating a pop-up operation. A control unit is configured to perform the pop-up operation by driving the actuator to rotate the door to a predetermined rotation angle, which is smaller than a fully opened angle, after a pop-up condition is satisfied, the pop-up condition that the pop-up instruction is detected while the door is unlocked and closed.

As another aspect of the present invention, a door control apparatus for a vehicle is provided as follows. An actuator is configured to change a rotation angle of a door of the vehicle to thereby rotate the door to be opened or closed in a use for a user to ride in or get out the vehicle. A touch sensor is configured to detect a touch of the user to the door. A control unit is configured to drive the actuator for rotating the door in a direction, in which the user intends to rotate the door, while the touch is detected by the touch sensor.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
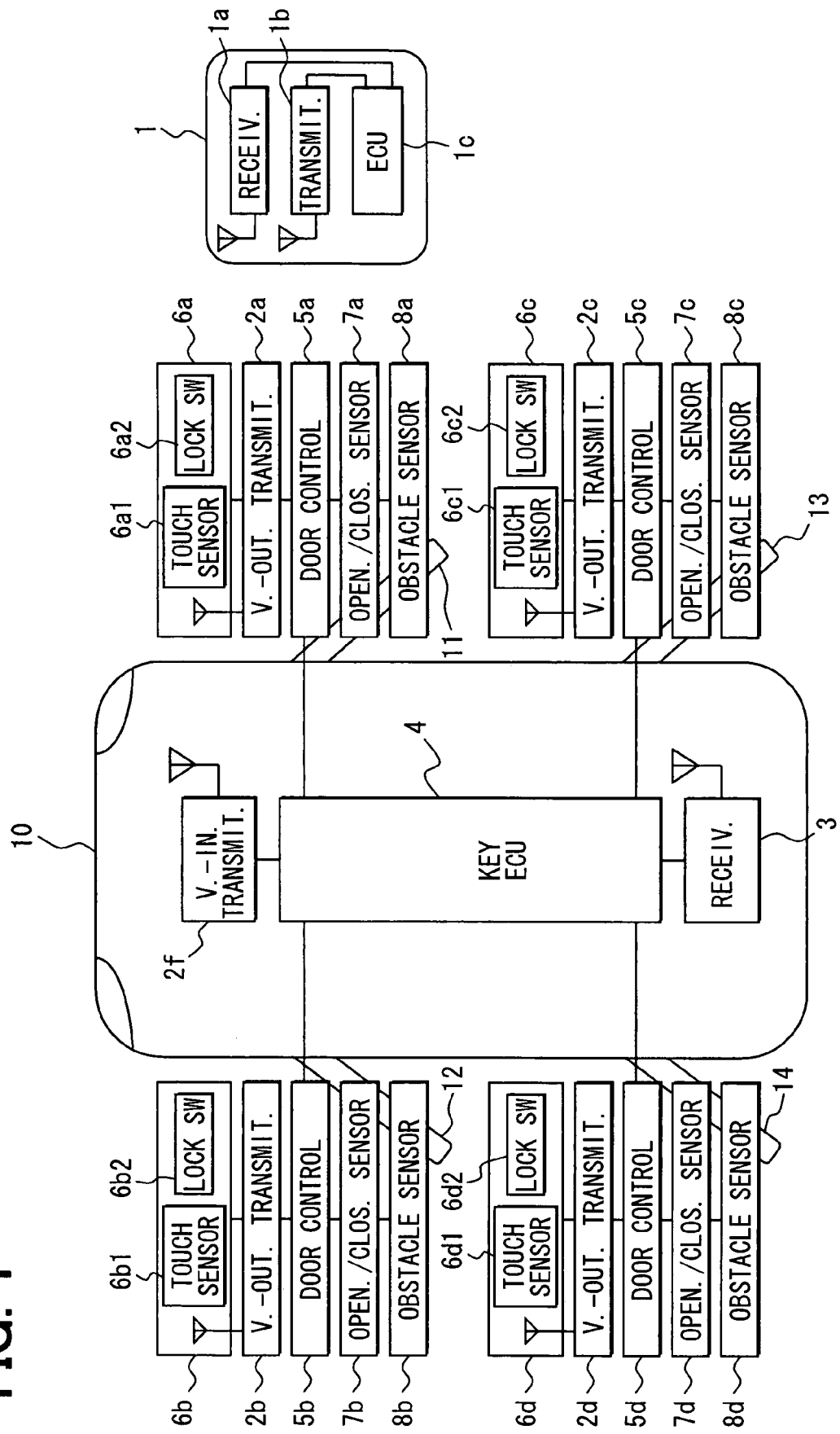
FIG. 1 is a diagram illustrating an overall configuration of a vehicle door control apparatus according to an embodiment of the present invention.

A vehicle door control apparatus according to an embodiment of the present invention will be explained below. FIG. 1 is an overall configuration of a vehicle door control apparatus for a vehicle 10.

The door control apparatus communicates with a handheld unit 1 (e.g., electronic key) to verify an ID code. Based on a result of the verification of the ID code, the following takes place: switching lock/unlock states of vehicle doors 11 to 14 to each other; performing a pop-up operation for opening each door 11 to 14 to a predetermined rotation angle; or assisting a user in opening or closing each door 11 to 14.

As shown in FIG. 1, the handheld unit 1 includes a receiver 1a and a transmitter 1b. The receiver 1a receives a request signal from a vehicle-outside transmitter 2a to 2d or vehicle-inside transmitter 2f. The transmitter 1b transmits a response signal including an ID code in reply to, the request signal. An ECU 1c (Electronic Control Unit) of the handheld unit 1 is connected with the receiver 1a and the transmitter 1b to control them. For instance, the ECU 1c performs the following: determining presence/absence of a request signal based on a reception signal of the receiver 1a; generating a response signal including an ID code or the like; and causing the transmitter 1b to transmit the generated response signal.

The door control apparatus includes vehicle-outside transmitters 2a to 2d disposed in the doors 11 to 14 of the vehicle 10 and a vehicle-inside transmitter 2f disposed in a compartment of the vehicle 10. These transmitters 2a to 2d, 2f transmit request signals based on a transmission instruction signal from an electronic key ECU 4.

In regard to the vehicle-outside transmitter 2a to 2d, a reachable distance (i.e., a detection area of the handheld unit 1) of a request signal is designed to be approximate 0.7 to 1.0 m. The electronic key ECU 4 instructs the vehicle-outside transmitters 2a to 2d to transmit request signals with predetermined intervals, for instance, while the vehicle 10 is parked. Thus, while the vehicle 10 is parked, a detection area is formed in proximity of each door 11 to 14 according to the reachable distance of the request signal. The detection area allows detection of a holder of the handheld unit 1 approaching the vehicle 10.

In regard to the vehicle-inside transmitter 2f, a reachable distance of a request signal is designed to cover the vehicle compartment. The electronic key ECU 4 instructs the vehicle-inside transmitter 2f to transmit a request signal when each door 11 to 14 is locked. This allows a detection as to whether or not the handheld unit 1 is inside the vehicle compartment when each door 11 to 14 is locked, which helps prevent the handheld unit 1 from being left and locked inside the vehicle compartment.

The door control apparatus includes a receiver 3, which is disposed inside of the vehicle compartment. The receiver 3 is in a state, in which a response signal can be received, in synchronization with an output of a transmission instruction signal to the transmitters 2a to 2f. Thus, the receiver 3 is to receive the response signal transmitted from the handheld unit 1. The receiver 3 outputs the received response signal to the electronic key ECU 4. The electronic key ECU 4 performs a verification process, which determines whether a predetermined condition is satisfied, e.g., whether an ID code included in the response signal accords with a registered ID code. When the accordance or correspondence between both the ID codes is successfully verified, the electronic key ECU 4 outputs the successful verification result to door control units 5a to 5d.

Each door control unit 5a to 5d is disposed in the corresponding door 11 to 14 to control the following: switching lock/unlock states of the vehicle door 11 to 14 to each other; performing a pop-up operation for opening the door 11 to 14; or assisting a user in opening or closing the door 11 to 14. The door control unit 5a to 5d will be explained in detail later.

A door handle 6a to 6d of each door 11 to 14 is provided with a touch sensor 6a1 to 6d1, which can detect a touch of a holder of the handheld unit 1, i.e., can detect that a holder of the handheld unit 1 touches the door handle 6a to 6d. When the touch of the holder is detected by each touch sensor 6a1 to 6d1, the corresponding door control unit 5a to 5d regards the touch of the holder as an unlock instruction operation and unlocks the corresponding door 11 to 14.

Further, each door handle 6a to 6d is provided with a door lock switch 6a2 to 6d2, which is a push-type switch. When the holder of the handheld unit 1 operates the door lock switch 6a2 to 6d2, the corresponding door control unit 5a to 5d locks the corresponding door 11 to 14. Here, the door handles 6a to 6d also individually serve as antennas of the vehicle-outside transmitters 2a to 2d.

Further, each door 11 to 14 is provided with a door opening/closing sensor 7a to 7d such as a touch sensor or pressure sensor. Each door opening/closing sensor 7a to 7d is provided to the door 11 to 14 and has a vehicle-outside sensor unit and a vehicle-inside sensor unit disposed in a door outside surface, which faces an outside of the vehicle and in a door inside surface, which faces an inside of the vehicle, i.e., the compartment. Each sensor unit is disposed near a position farthest from a rotational pivot of the door. In other words, the door opening/closing sensor 7a to 7d includes a vehicle-inside sensor unit serving as an opening sensor unit for detecting opening of the door 11 to 14 and a vehicle-outside sensor unit serving as a closing sensor unit for detecting closing of the door 11 to 14. The door opening/closing sensor 7a to 7d detects that a user intends to rotate the door 11 to 14 in the opening or closing direction while touching a door inside surface or a door outside surface.

Further, each door 11 to 14 is provided with an obstacle sensor 8a to 8d, which is to detect an obstacle within a rotation range of the door 11 to 14 when the door 11 to 14 opens or closes. The obstacle sensor 8a to 8d is an ultrasonic sensor or infrared sensor.

Next, the door control unit 5a to 5d will be explained below with reference to FIGS. 2, 3. The door control units 5a to 5d of the doors 11 to 14 have an identical configuration, so explanation will be done with respect to the door control unit 5a.

Figure 2:
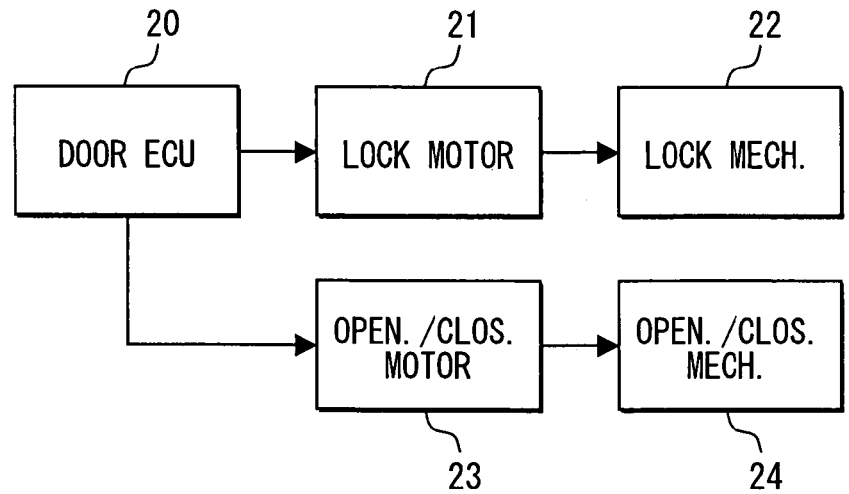
FIG. 2 is a diagram illustrating a configuration of a door control unit.

As shown in FIG. 2, the door control unit 5a includes a door ECU 20, a door lock motor 21, a lock mechanism 22, a door opening/closing motor 23, and a door opening/closing mechanism 24.

The door lock motor 21 drives the lock mechanism 22 clockwise or anti-clockwise based on an instruction from the door ECU 20. Thus, the lock mechanism 22 can lock or unlock the door 11.

The door opening/closing motor 23 serves as an actuator to drive the door opening/closing mechanism 24 to thereby release a latch mechanism of the door 11 and perform a pop-up operation, which rotates the door 11 to a predetermined rotation angle. Further, when a user intends to open or close the door 11 by touching a door inside surface or door outside surface to thereby open or close the door 11, the door opening/closing motor 23 assists a user in opening or closing the door 11.

Figure 3:
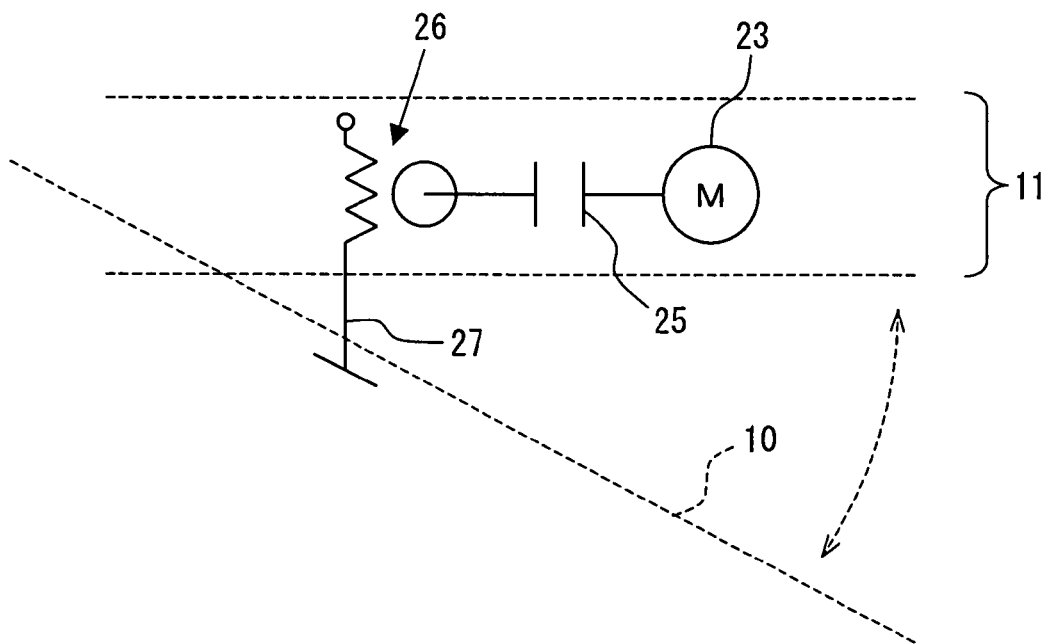
FIG. 3 is a diagram for explaining a configuration of the door opening/closing motor and door opening/closing mechanism.

FIG. 3 is a diagram for explaining a configuration of the door opening/closing motor 23 and door opening/closing mechanism 24. However, FIG. 3 does not show a configuration for switching latch/release states to each other by the latch mechanism and door opening/closing motor 23.

As shown in FIG. 3, the door 11 is supported at a rotation pivot (not shown) and is rotated in an arc line relative to the side of the body of the vehicle 10. As the rotation angle of the door 11 increases, a gap between the door 11 and the body of the vehicle 10 increases to thereby facilitate user's riding in or getting out the vehicle 10.

The door 11 internally contains the door opening/closing motor 23, a rotation transmission clutch 25, a rotating-reciprocating conversion mechanism 26, and an extensible rod 27. When the rotation transmission clutch 25 is in a disconnected state, the extensible rod 27 is freely lengthened or shortened. Thus, the door 11 can be opened or closed to an optional angle based on a force or action applied by a user. In contrast, when the rotation transmission clutch 25 is in a connected state, the rotation of the door opening/closing motor 23 is transmitted via the clutch 25 to the rotating-reciprocating conversion mechanism 26. The extensible rod 27 is lengthened or shortened according to the rotation of the motor 23 to thereby change the rotation angle of the door 11. When the motor 23 stops its rotation, the door 11 is maintained at a rotation angle corresponding to the position where the motor 23 stops.

The door ECU 20 locks or unlocks the door 11 by rotating the door lock motor 21 normally or reversely based on an instruction from the electronic key ECU 4. When the door 11 is unlocked, the electronic key ECU 4 controls driving of the door opening/closing motor 23 to rotate or open the door 11 to a predetermined rotation angle based on an instruction for pop-up operation. When the opening/closing sensor 7a detects that the user intends to open or close the door 11, the electronic key ECU 4 drives the door opening/closing motor 23 to assist the user in opening or closing the door.

Figure 4:
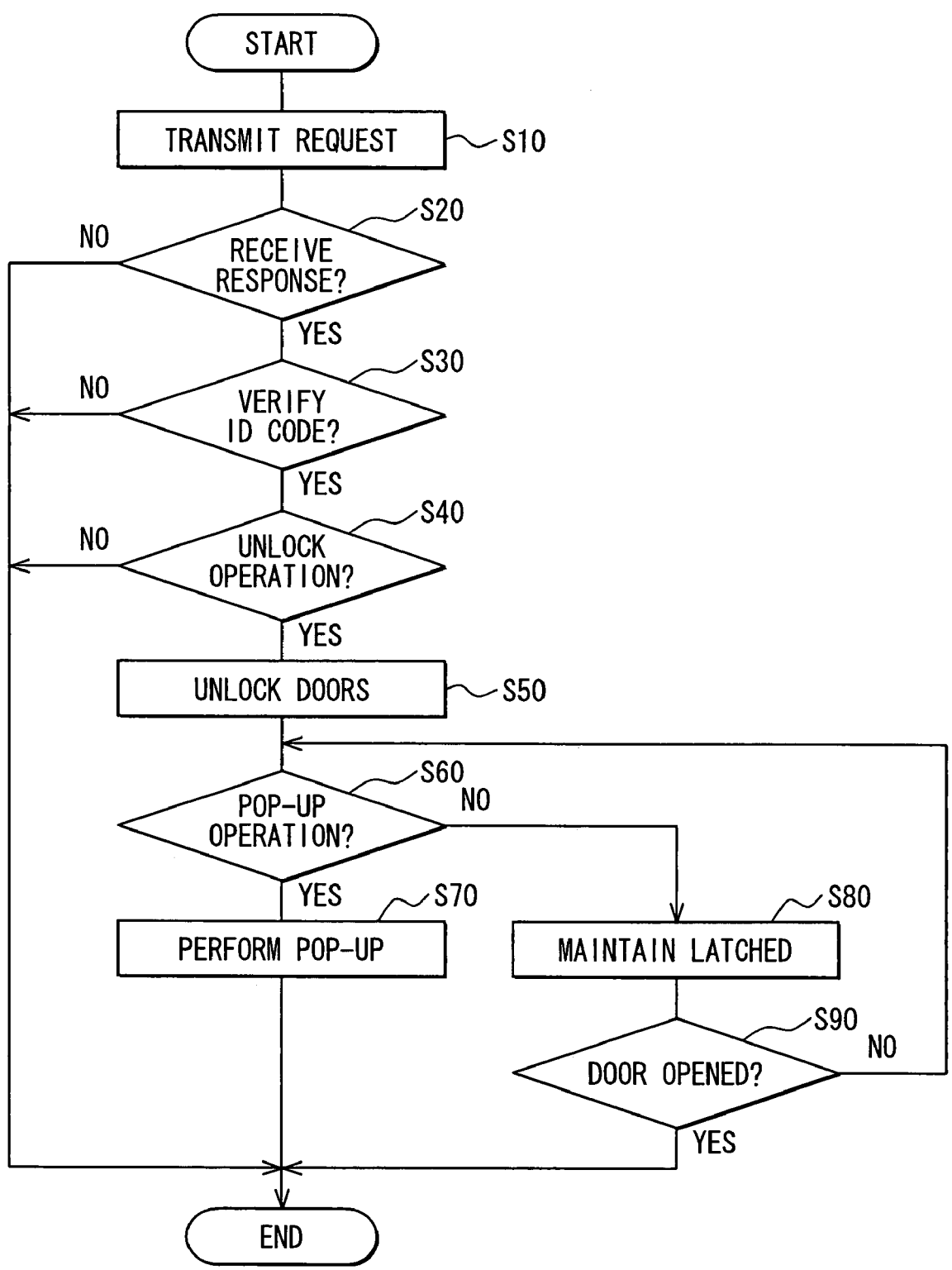
FIG. 4 is a flowchart diagram illustrating a process for unlocking a door based on verification of an ID code from a handheld unit.

Next, a process for unlocking each door 11 to 14 will be explained with reference to a flowchart in FIG. 4. This process is performed based on a result of the verification of an ID code from the handheld unit 1.

At Step S10, a transmission instruction signal is outputted to each vehicle-outside transmitter 2*a* to 2*d;* thereby, a request signal is transmitted. At Step S20, it is determined whether a response signal in reply to the request signal is received or not. When a response signal is not received, it is determined that no handheld unit 1 is located within a detection area of each door 11 to 14. In contrast, when a response signal is received, Step S30 is then performed.

Here, each vehicle-outside transmitter 2*a* to 2*d* transmits a request signal including a door identification code unique thereto; the handheld unit 1 returns a response signal including the received door identification code. Alternatively, the electronic key ECU 4 instructs the individual transmitter 2*a* to 2*d* to transmit request signals one by one in a sequential order, e.g., in the order of one signal of the transmitter 2*a*, one signal by the transmitter 2*b*, one signal by the transmitter 2*c*, one signal by the transmitter 2*d*, and so on. Thus, the electronic key ECU 4 can determine which transmitter 2*a* to 2*d* the handheld unit 1 responds to. In other words, the electronic key ECU 4 can determine which door 11 to 14 the holder of the handheld unit 1 approaches.

At Step S30, the electronic key ECU 4 performs a verification process, which determines whether a predetermined condition is satisfied, e.g., whether an ID code included in the response signal accords with a previously registered ID code. When the accordance between the IDs is verified, i.e., when the determination at Step S30 is affirmed, Step S40 is then performed. When the accordance between the IDs is not verified, i.e., when the determination at Step S30 is negated, the process is terminated.

When the accordance between the IDs is verified, the electronic key ECU 4 identifies the transmitter 2*a* to 2*d* the handheld unit 1 responded to based on the door identification code or time sequence in reception. The ECU 4 issues an instruction signal to the corresponding door control unit 5*a* to 5*d* for moving or switching the corresponding door 11 to 14 to an unlock standby state. Based on the instruction signal, the corresponding door control unit 5*a* to 5*d* activates a touch sensor 6*a*1 to 6*d*1 for detecting a touch of a user to the corresponding door handle 6*a* to 6*d*.

When detecting that the holder of the handheld unit 1 touches the door handle 6*a* to 6*d*, the activated touch sensor 6*a*1 to 6*d*1 transmits the detection of the touch to the electronic key ECU 4. At Step S40, the electronic key ECU 4 determines that the holder of the handheld unit 1 performs an unlock operation and then Step S50 is performed. In contrast, when a predetermined time period elapses while the electronic key ECU 4 does not detect that the holder of the handheld unit 1 touches the door handle 6*a* to 6*d*, the process is terminated.

At Step S50, the electronic key ECU 4 instructs all the door control units 5*a* to 5*d* to unlock the doors 11 to 14. As a result, all the doors 11 to 14 can be unlocked when the holder of the handheld unit 1 merely touches the door handle 6*a* to 6*d*.

Here, a push-type unlock button maybe provided in the door handle 6*a* to 6*d*. In this case, unlocking operation to the doors 11 to 14 by the holder of the handheld unit 1 can be alternatively detected by manipulating the push-type unlock button, instead of touching the touch sensor 6*a*1 to 6*d*1.

Further, either the touch sensors 6*a*1 to 6*d*1 or door lock switches 6*a*2 to 6*d*2 may be provided to the doors 11 to 14 to be in common use for unlocking and locking.

At Step S60, the door control unit 5*a* to 5*d* determines whether the user, e.g., the holder of the handheld unit 1, request a pop-up operation. Once the doors 11 to 14 are unlocked, any user other than the holder of the handheld unit 1 can request a pop-up operation.

For instance, when the touch sensor 6*a*1 to 6*d*1 comes to not detect the touch, the door control unit 5*a* to 5*d* determines that a pop-up operation is required. Thus, when the user releases his/her hand from the door handle 6*a* to 6*d*, a pop-up operation to the door 11 to 14 can be started. This helps prevent the door 11 to 14 undergoing the pop-up operation from abutting to a part of the body of the user.

Alternatively, when the touch sensor 6*a*1 to 6*d*1 continues detecting the touch more than a predetermined time period, the door control unit 5*a* to 5*d* may determine that a pop-up operation is required. Further, alternatively, when unlock operations detected by the touch sensor 6*a*1 to 6*d*1 are repeated in predetermined repetition times, the door control unit 5*a* to 5*d* may determine that a pop-up operation is required. As explained above, when a user performs a certain operation different from a usual one is applied to the door handle 6*a* to 6*d* (or touch sensor 6*a*1 to 6*d*1), the door control unit 5*a* to 5*d* determines that a pop-up operation is required. Therefore, the user can determine whether a pop-up operation should be started or not.

Further, the vehicle 10 may be provided with a speech recognition device including a microphone. The door control unit 5*a* to 5*d* can be designed to determine that a pop-up operation is required based on recognition of a speech corresponding to an instruction or request for a pop-up operation. In this case, the user can provide an instruction for the pop-up operation of the door 11 to 14 without need to manipulate a switch or the like.

When a pop-up operation is requested at Step S60, a pop-up operation is performed for driving the door opening/closing motor 23 to thereby release the latch of the door 11 to 14 and rotate the door 11 to 14 to a predetermined rotation angle, which is smaller than a fully opened angle, at which the door is fully opened. The predetermined rotation angle is set to allow a user to insert a part of his/her body such as an elbow, wrist, or the like into a gap formed by the door positioned at the predetermined rotation angle.

In contrast, when it is determined that a pop-up operation is not requested at Step S60, Step S80 is then performed to maintain a latched state of the door 11 to 14 to continue closing the door 11 to 14. At Step S90, it is determined whether the user pulls the door handle 6*a* to 6*d* to release the latch and the door 11 to 14 is thereby opened, for instance, based on a signal from a switch of a courtesy light (i.e., compartment interior light). When the determination at Step S90 is affirmed, the process is terminated. In contrast, when the determination at Step S90 is negated, Step S60 is repeated again.

The above pop-up operation can eliminate the following user's operations: pulling a door handle 6*a* to 6*d* to thereby release the latch state of the door 11 to 14; or forcibly opening the door 11 to 14. Therefore, even when the user holds stuff in his/her hands or arms, the door 11 to 14 can be easily opened to the predetermined rotation angle. After the door 11 to 14 is opened to the predetermined rotation angle, the user can insert a part of his/her body into a gap formed by the door 11 to 14 positioned at the predetermined rotation angle and then further open the door 11 to 14 by pushing the door 11 to 14 from the door inside surface. This can be sufficiently performed even by a user who has stuff in both the hands or arms.

Figure 5A:
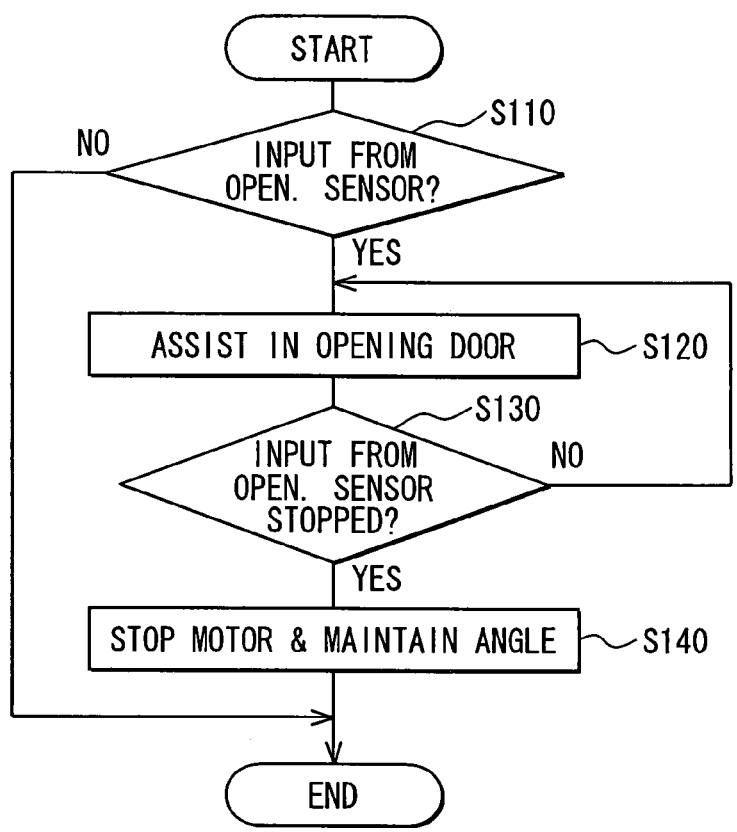
FIG. 5A is a flowchart diagram illustrating a process for assisting in opening a door.
Figure 5B:
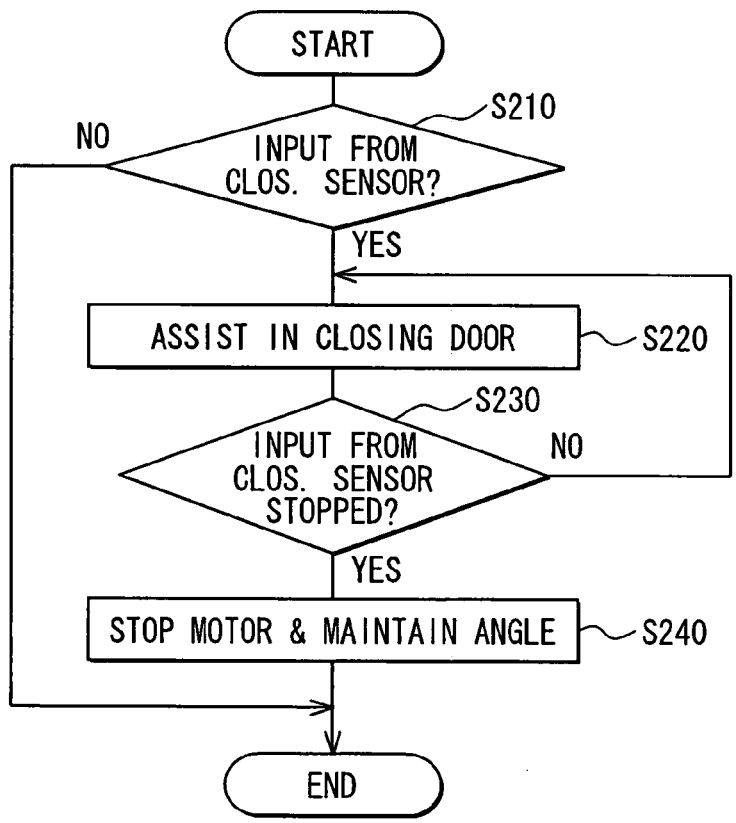
FIG. 5B is a flowchart diagram illustrating a process for assisting in closing a door.

In this embodiment, the vehicle door control apparatus performs processes in flowcharts in FIGS. 5A, 5B to assist a user in opening/closing a door by using the opening/closing motor 23 for a purpose to facilitate user's operations in opening/closing the door. FIG. 5A shows a flowchart of a process for assisting a user in opening a door; FIG. 5B shows a flowchart of a process for assisting a user in closing a door.

As shown in FIG. 5A, at Step S110, it is determined whether a detection signal of the opening sensor unit (i.e., vehicle-inside sensor unit) of the door opening/closing sensor 7a to 7d is inputted or not. When the determination is affirmed, Step S120 is performed; when negated, the process is terminated.

When a detection signal of the opening sensor unit of the door opening/closing sensor 7a to 7d is inputted, it is assumed that a user intends to push the door 11 to 14 from a door inside surface to thereby open the door 11 to 14. To that end, at Step S120, the door opening/closing motor 23 is driven to assist the user in opening the door 11 to 14. This allows the user to open the door 11 to 14 with a slight force. Thus, the user can easily open the door 11 to 14.

When the door opening/closing sensor 7a to 7d is a pressure sensor, the opening/closing motor 23 is preferably driven to allow the pushing or touching force applied to the door inside surface of the door 11 to 14 to be kept within a predetermined value. Thus, even when the vehicle 10 is parked in a sloping ground, the user can open the door 11 to 14 without need of changing the force applied to the door.

Further, while the user is assisted in opening a door, it is determined whether an obstacle is present within a rotation area or range of the door 11 to 14 by using the obstacle sensor 8a to 8d. When an obstacle is detected, the rotation of the door 11 to 14 is stopped regardless of user's operation for opening the door 11 to 14. This helps prevent the door 11 to 14 from mistakenly colliding with the obstacle.

At Step S130, it is determined whether inputting of the detection signal from the opening sensor unit is stopped. When the determination is negated, it is assumed that the user continues opening the door 11 to 14. Therefore, Step S120 is continued. When the determination is affirmed, Step S140 is then performed to stop driving of the door opening/closing motor 23 to thereby maintain the door 11 to 14 at the corresponding rotation angle. This allows the user to maintain the door 11 to 14 at an optional rotation angle.

For instance, a pressure sensor may be provided in the extensible rod 27. In this case, a user rides in the compartment of the vehicle 10 and intends to close the door 11 to 14 from the compartment side, which can be detected by the pressure sensor. Then, the rotation transmission clutch 25 is switched or moved to a disconnected state to thereby allow the door 11 to 14 to freely rotate. Alternatively, closing operation can be facilitated by driving the door opening/closing motor 23.

The process assisting in door closing operation in FIG. 5B includes Steps S210, S220, S230, S240, which are basically equivalent to Steps S110, S120, S130, S140 assisting in door opening operation in FIG. 5A. The difference of FIG. 5B from FIG. 5A is that assistance by driving the door opening/closing motor 23 is activated based on a detection signal from the closing sensor unit (i.e., vehicle-outside sensor unit) of the door opening/closing sensor 7a to 7d in the door outside surface of the door 11 to 14 for closing the door 11 to 14. Therefore, further explanation for the flowchart for assisting in the door closing operation is omitted.

(Modifications)

In the above embodiment, the vehicle door control apparatus performs both (i) the pop-up operation for the door 11 to 14 and (ii) the assisting operation in opening/closing the door 11 to 14; however, it may be either the pop operation or the assisting operation in opening/closing.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As a first aspect, a door control apparatus for a vehicle is provided as follows. The apparatus can communicate with a handheld unit held by a user. An actuator is configured to change a rotation angle of a door of the vehicle to thereby rotate the door to be opened or closed in a use for the user to ride in or get out the vehicle. A verification unit is configured to obtain an ID code of the handheld unit to verify an accordance between the obtained ID code and a registered ID code. A manipulation detection unit is configured to detect a manipulation by the user to an unlock switch in a door handle of the door. An unlock unit is configured to unlock the door when the accordance is verified and the manipulation to the unlock switch is detected. An instruction detection unit is configured to detect a pop-up instruction, which is issued by the user approaching the door for activating a pop-up operation. A control unit is configured to perform the pop-up operation by driving the actuator to rotate the door to a predetermined rotation angle, which is smaller than a fully opened angle, after a pop-up condition is satisfied, the pop-up condition that the pop-up instruction is detected while the door is unlocked and closed.

Thus, after a user provides an instruction for pop-up operation, the vehicle door is opened from the closed state to the predetermined rotation angle, which is smaller than the fully opened rotation angle. The predetermined rotation angle for the pop-up operation is defined as an angle of a gap, which allows a user to insert his/her wrist or elbow. After inserting the part of the body into the gap of the door, the user then pushes an inside surface of the door to thereby open the door. This can be performed even by a user who has stuff in both hands or arms. In other words, the user only pulls the door handle without need to release the latch of the door or open the door; thereby, the door smoothly opens even if the user cannot use his/her hands.

As an additional aspect of the door control apparatus of the first aspect, a vehicle-inside sensor unit is provided to an inside surface of the door for detecting a touch of the user. Here, the control unit assists the user in opening the door by driving the actuator while the touch is detected by the vehicle-inside sensor unit.

As an additional aspect of the door control apparatus of the first aspect, a vehicle-outside sensor unit is provided in an outside surface of the door for detecting a touch of the user. Here, the control unit assists the user in closing the door by driving the actuator while the touch is detected by the vehicle-outside sensor unit.

As an additional aspect of the door control apparatus of the first aspect, an obstacle detection unit is provided for detecting an obstacle present within a range covered by the rotation angle when the door is rotated. Here, when the obstacle is detected, the control unit stops rotating the door to prevent the door from colliding with the obstacle.

As an additional aspect of the door control apparatus of the first aspect, the instruction detection unit regards, as detecting a pop-up instruction issued by the user, a condition that the manipulation to the unlock switch is finished. Here, when the user finishes manipulation to the unlock switch in the door handle and releases the hand from the unlock switch, the pop-up operation can be automatically started. This helps prevent collision of the door with part of the user's body.

Further, the unlock switch is preferred to be a touch switch which detects that the user touches the door handle. Thus, the user easily operates the unlock switch even when the user holds stuff in both the arms. Further, when the user releases the door handle, the operation of the unlock switch is finished.

As an additional aspect of the door control apparatus of the first aspect, the instruction detection unit regards, as detecting a pop-up instruction issued by the user, a condition that the manipulation to the unlock switch continues more than a predetermined time period. Alternatively, the instruction detection unit regards, as detecting a pop-up instruction issued by the user, a condition that a manipulations count the unlock switch is manipulated is more than a predetermined value. Thus, when an operation different from a usual operation is applied to the unlock switch, the pop-up operation is activated. Therefore, the user can determine whether the pop-up operation should be started or not.

As an additional aspect of the door control apparatus of the first aspect, the pop-up instruction issued by the user may be a predetermined speech uttered by the user. In this case, the user can provide an instruction for the pop-up operation to the vehicle door without need to manipulate a switch.

Further, as another aspect, the door control apparatus of the first aspect may be achieved independent from performing the pop-up operation and/or cooperating with the hand-held unit. That is, an actuator is configured to change a rotation angle of a door of the vehicle to thereby rotate the door to be opened or closed in a use for a user to ride in or get out the vehicle. A touch sensor is configured to detect a touch of the user to the door. A control unit is configured to drive the actuator for rotating the door in a direction, in which the user intends to rotate the door, while the touch is detected by the touch sensor.

It will be obvious to those skilled in the art that various changes may be made in the above-described embodiments of the present invention. However, the scope of the present invention should be determined by the following claims.

What is claimed is:

1. A door control apparatus for a vehicle, the apparatus communicative with a handheld unit held by a user, the apparatus comprising:
   an actuator configured to change a rotation angle of a door of the vehicle to thereby rotate the door to be opened or closed in a use for the user to ride in or get out the vehicle;
   a verification unit configured to obtain an ID code of the handheld unit to verify an accordance between the obtained ID code and a registered ID code;
   a manipulation detection unit configured to detect a manipulation by the user to an unlock switch in a door handle of the door;
   an unlock unit configured to unlock the door when the accordance is verified and the manipulation to the unlock switch is detected;
   an instruction detection unit configured to detect a pop-up instruction, which is issued by the user approaching the door for activating a pop-up operation; and
   a control unit configured to perform the pop-up operation by driving the actuator to rotate the door to a predetermined rotation angle, which is smaller than a fully opened angle, after a pop-up condition is satisfied, the pop-up condition that the pop-up instruction is detected while the door is unlocked and closed.

2. The door control apparatus of claim 1, further comprising:
   a vehicle-inside sensor unit provided to an inside surface of the door for detecting a touch of the user,
   wherein the control unit assists the user in opening the door by driving the actuator while the touch is detected by the vehicle-inside sensor unit.

3. The door control apparatus of claim 1, further comprising:
   a vehicle-outside sensor unit provided in an outside surface of the door for detecting a touch of the user,
   wherein the control unit assists the user in closing the door by driving the actuator while the touch is detected by the vehicle-outside sensor unit.

4. The door control apparatus of claim 1, further comprising:
   an obstacle detection unit configured to detect an obstacle present within a range covered by the rotation angle when the door is rotated,
   wherein when the obstacle is detected, the control unit stops rotating the door to prevent the door from colliding with the obstacle.

5. The door control apparatus of claim 1, wherein
the instruction detection unit regards, as detecting a pop-up instruction issued by the user, a condition that the manipulation to the unlock switch is finished.

6. The door control apparatus of claim 5, wherein
the unlock switch is a touch switch which detects that the user touches the door handle.

7. The door control apparatus of claim 1, wherein
the instruction detection unit regards, as detecting a pop-up instruction issued by the user, a condition that the manipulation to the unlock switch continues more than a predetermined time period.

8. The door control apparatus of claim 1, wherein
the instruction detection unit regards, as detecting a pop-up instruction issued by the user, a condition that a manipulations count the unlock switch is manipulated is more than a predetermined value.

9. The door control apparatus of claim 1, wherein
the pop-up instruction issued by the user is a predetermined speech uttered by the user.

10. A door control apparatus for a vehicle, the apparatus comprising:
    an actuator configured to change a rotation angle of a door of the vehicle to thereby rotate the door to be opened or closed in a use for a user to ride in or get out the vehicle;
    a touch sensor configured to detect a touch of the user to the door; and
    a control unit configured to drive the actuator for rotating the door in a direction, in which the user intends to rotate the door, while the touch is detected by the touch sensor.

11. The door control apparatus of claim 10, wherein
the touch sensor includes a vehicle-inside sensor unit provided to an inside surface of the door, and the control unit assists the user in opening the door by driving the actuator while the touch is detected by the vehicle-inside sensor unit.

12. The door control apparatus of claim 10, wherein the touch sensor includes a vehicle-outside sensor unit provided in an outside surface of the door, and the control unit assists the user in closing the door by driving the actuator while the touch is detected by the vehicle-outside sensor unit.

13. The door control apparatus of claim 10, further comprising:

an obstacle detection unit configured to detect an obstacle present within a range covered by the rotation angle when the door is rotated, wherein when the obstacle is detected, the control unit stops rotating the door to prevent the door from colliding with the obstacle.

\* \* \* \* \*